United States Patent
Kashimoto et al.

[11] Patent Number: 6,157,433
[45] Date of Patent: Dec. 5, 2000

[54] METHOD OF MANUFACTURING LIQUID-CRYSTAL DISPLAY DEVICE HAVING A PLURALITY OF DIVIDED REGIONS

[75] Inventors: Noboru Kashimoto, Fukaya; Hisaaki Hayashi, Hyogo-ken, both of Japan

[73] Assignee: Kabushiki Kaisha Toshiba, Kawasaki, Japan

[21] Appl. No.: 09/266,801

[22] Filed: Mar. 12, 1999

[30] Foreign Application Priority Data

Mar. 12, 1998 [JP] Japan .................. 10-061090

[51] Int. Cl.[7] .............. G02F 1/13; G02F 1/1339
[52] U.S. Cl. ............. 349/187; 349/153; 349/190
[58] Field of Search ................ 349/153, 187, 349/190; 430/314, 317; 438/30, 946; 156/304.1, 304.5

[56] References Cited

U.S. PATENT DOCUMENTS

| | | | |
|---|---|---|---|
| 4,792,210 | 12/1988 | Maurice | 350/334 |
| 4,878,086 | 10/1989 | Isohata et al. | 355/77 |
| 5,087,113 | 2/1992 | Sakono et al. | 359/59 |
| 5,162,931 | 11/1992 | Holmberg | 359/54 |
| 5,419,991 | 5/1995 | Segawa | 430/20 |
| 5,459,092 | 10/1995 | Kawasaki et al. | 437/51 |
| 5,466,620 | 11/1995 | Bang | 437/51 |
| 5,656,526 | 8/1997 | Inada et al. | 430/314 |
| 5,784,135 | 7/1998 | Inada et al. | 349/85 |
| 5,916,735 | 6/1999 | Nakashima et al. | 430/314 |

FOREIGN PATENT DOCUMENTS

95/16276  6/1995  WIPO .

Primary Examiner—William L. Sikes
Assistant Examiner—Tarifur R. Chowdhury
Attorney, Agent, or Firm—Pillsbury Madison & Sutro LLP

[57] ABSTRACT

A conductor layer is formed on a glass substrate of a liquid-crystal display device, and a resist layer is formed on the conductor layer. The resist layer is dividedly exposed into a plurality of divided regions. Then the conductor layer is etched through the resist layer and patterned. At the time of the division exposure, a boundary line of each of the respective divided regions is formed in a zigzag shape and engaged with a boundary line of another adjacent one of the divided regions. The zigzag-shaped boundary line of each divided region has such a pattern as to extend into another diagonally opposed one of the divided regions at a cross-shaped region where a vertical boundary line horizontally dividing the divided regions and a horizontal boundary line vertically dividing the divided regions intersect at right angles.

4 Claims, 5 Drawing Sheets

METHOD OF MANUFACTURING LIQUID-CRYSTAL DISPLAY DEVICE HAVING A PLURALITY OF DIVIDED REGIONS

BACKGROUND OF THE INVENTION

The present invention relates to a method of manufacturing an active matrix type liquid-crystal display device.

A liquid-crystal display device is thin and light and the power consumption thereof is low. By virtue of these features, it is widely used as a display device for notebook-type personal computers and word-processors and small-sized TVs. In particular, an active-matrix type liquid-crystal display device is promising for a large-sized TVs and the like, since it has a quick responsiveness and a high contrast and is capable of multi-gray-scale display.

The liquid-crystal display device comprises electrodes such as scan lines and switching elements such as thin-film transistors. The liquid-crystal display device is manufactured by repeating thin-film forming steps, PEP steps for forming photoresist masks, and etching steps for removing unnecessary portions of thin films.

In these years, with an increase in size of screens of the liquid-crystal display devices, a manufacturing apparatus matching with large screens is required. However, exposure of photoresist for a large screen can be performed by using a conventional small-sized exposure apparatus by dividedly exposing a plural divided regions of the screen.

In general, when a photoresist, etc. is dividedly exposed, there is a case where positional displacement at the time of exposure is visually recognized at the division lines or boundaries of the divided regions. To cope with this problem, the division lines are formed of turned-up regions or insular regions, thereby smoothing a variation gradient of characteristics at boundaries between the divided regions and making seams of divided regions less visible.

When a photoresist is dividedly exposed, intersections of horizontal division lines and vertical division lines are generally formed of straight line segments. If the width of regions of the horizontal division lines and vertical division lines is increased to make the boundaries of the divided regions less visible, the straight line segments at the intersections are elongated. Consequently, exposure displacement may be visually recognized at the straight line segments. More specifically, the boundaries become less visible if the division lines are formed of turned-up regions or insular regions and the width of engagement portions of adjacent divided regions is increased. In this case, however, at the intersections, the boundaries become straight line segments with no insular or turned-up regions, and these straight line segments may be recognized.

BRIEF SUMMARY OF THE INVENTION

The present invention has been made in consideration of the above circumstances, and its object is to provide a method of manufacturing a large-area liquid-crystal display device with high display quality, wherein seams among divided regions can be made less visible.

In order to achieve the object, there is provided a method of manufacturing a liquid-crystal display device, the method comprising: forming at least one of a conductive layer and a dielectric layer on an insulating substrate; forming a resist layer on the one layer; dividedly exposing the resist layer into a plurality of divided regions; and patterning the one layer into a predetermined shape by etching the one layer through the exposed resist layer. At the time of the exposure, a boundary line of each of the respective divided regions is formed in a zigzag shape and engaged with a boundary line of another adjacent one of the divided regions, and the zigzag-shaped boundary line of at least one of the divided regions has such a pattern as to extend into another diagonally opposed one of the divided regions at a region where a vertical boundary line horizontally dividing the divided regions and a horizontal boundary line vertically dividing the divided regions intersect or are joined with each other.

For example, at a cross-shaped intersection where the horizontal boundary line and the vertical boundary line intersect at right angles, a boundary line of at least one of the four adjacent divided regions has such a pattern as to extend into another of the divided regions which is diagonally adjacent with the intersection interposed.

At a T-shaped intersection of the horizontal boundary line and the vertical boundary line, a boundary line of at least one of the three adjacent divided regions has such a pattern as to extend into another of the divided regions which is diagonally adjacent with the intersection interposed.

At a L-shaped joint portion of the horizontal boundary line and the vertical boundary line, a boundary line of at least one of the two adjacent divided regions has such a pattern as to extend into the other of the divided regions which is diagonally adjacent with the joint portion interposed.

According to the above-mentioned method, at the time of performing the divisional exposure, even at the region where the boundary line horizontally dividing the divided regions and the boundary line vertically dividing the divided regions intersect or are joined with each other, a gradient in variation of optical characteristics of the boundary regions can be decreased. It is thus possible to manufacture a liquid-crystal display device with high display quality, wherein the boundary lines or seams of the divided regions can be made less visible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A method of manufacturing an active matrix type liquid-crystal display device, according to an embodiment of the present invention, will now be described in detail with reference to the accompanying drawings. At first, an example of the active matrix type liquid-crystal display device will be described.

Figure 1:
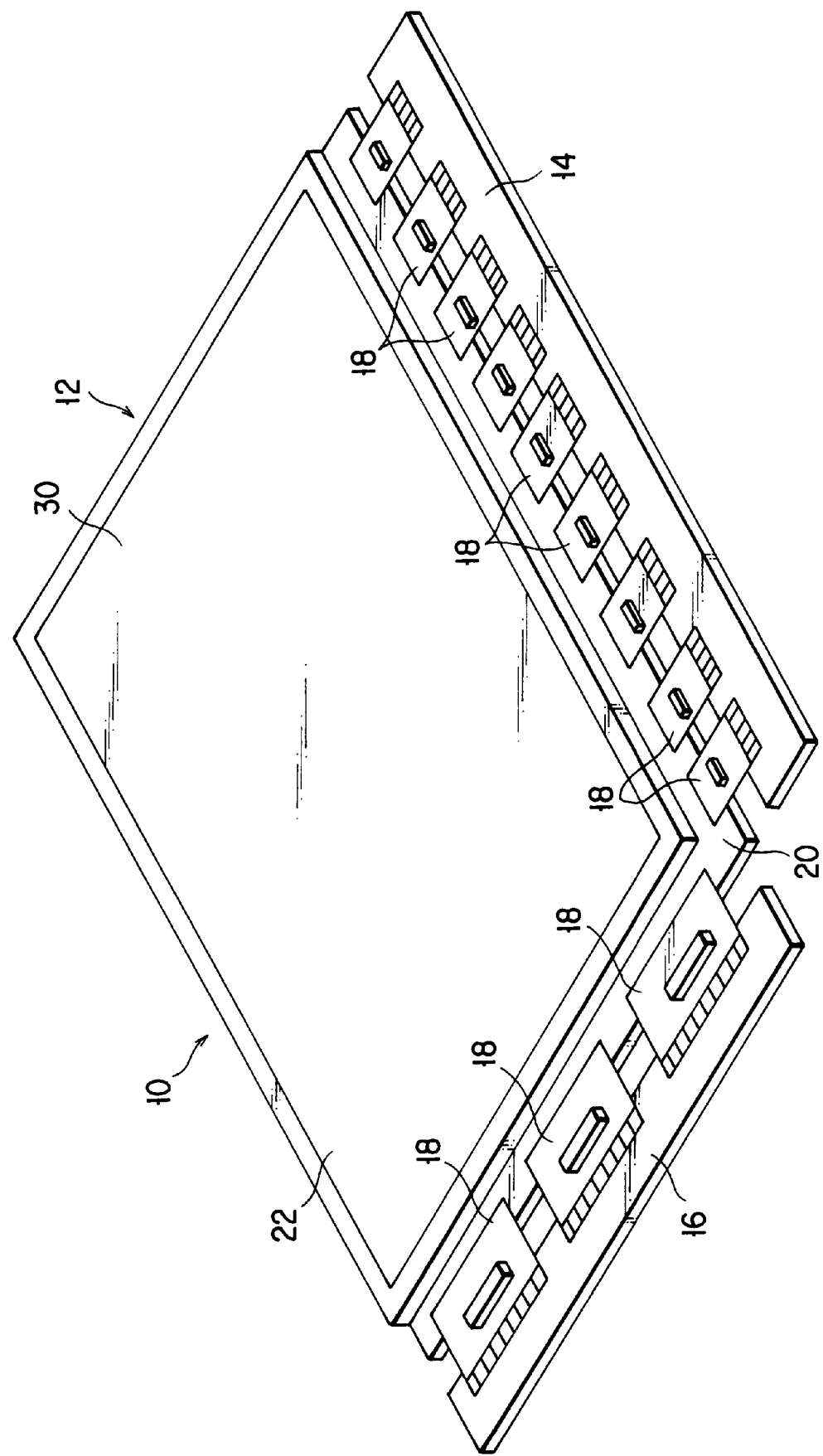
FIG. 1 is a perspective view showing an example of an active matrix type liquid-crystal display device.

As is shown in FIG. 1, an active matrix type liquid-crystal display device 10 is constructed as a light transmission type liquid-crystal display device, and it has a display region 30 with a diagonal dimension of 12.1 inches.

The liquid-crystal display device 10 comprises a liquid-crystal display panel 12, a signal line drive circuit board 14, a scanning line drive circuit board 16 for driving the liquid-crystal display panel, and a plurality of tape carrier packages (hereinafter referred as TCP) 18 for electrically connecting the respective drive circuit boards and the liquid-crystal display panel 12.

Figure 2:
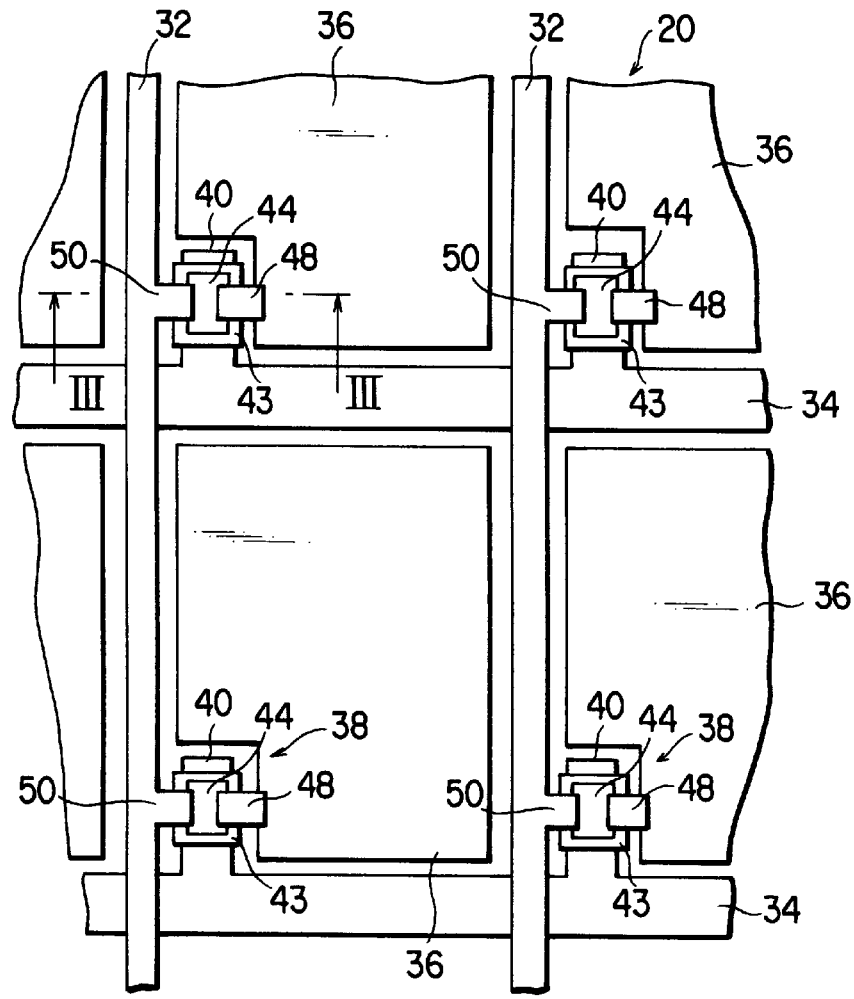
FIG. 2 is a plan view schematically showing an array substrate of the active matrix type liquid-crystal display device.
Figure 3:
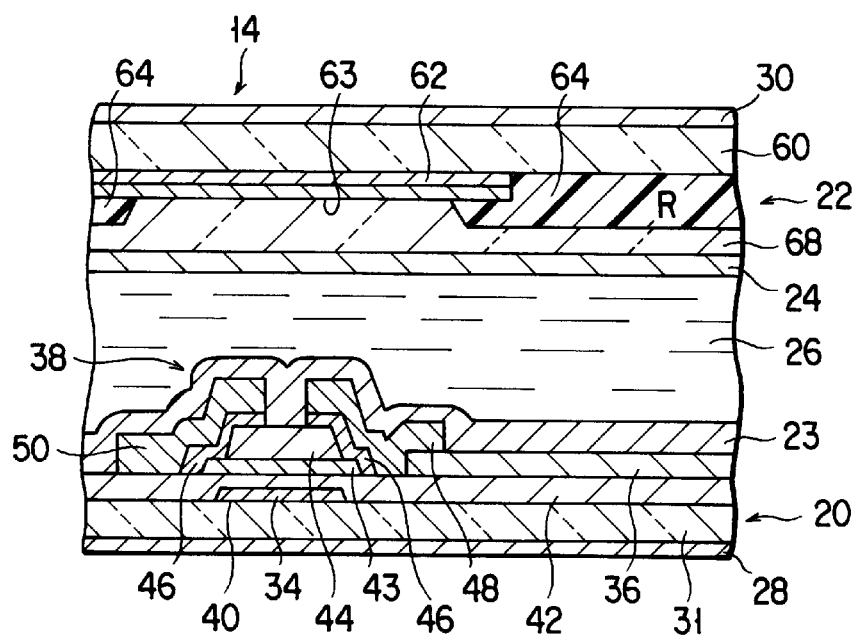
FIG. 3 is a cross-sectional view taken along line III—III in FIG. 2.

As is shown in FIGS. 1 to 3, the liquid-crystal display panel 12 includes an array substrate 20 and an opposite substrate 22. These substrates 20 and 22 are opposed to each other with a predetermined gap by attaching their peripheral portions by means of a sealing agent (not shown). A liquid crystal layer 26 serving as a light modulation layer is sealed between the array substrate 20 and opposite substrate 22 with aligning films 23 and 24 interposed. Polarizing plates 28 and 30 are provided on outer surfaces of the array substrate 20 and opposite substrate 22. The polarizing plates 28 and 30 are arranged such that their polarizing axes intersect at right angles.

The array substrate 20 has a glass substrate 31 as an insulating substrate. A number of signal lines 32 and a number of scanning lines 34 both serving as wiring elements are arranged in a matrix so as to be substantially perpendicular to each other. Pixel electrodes 36 formed of ITO are provided in respective regions surrounded by the signal lines 32 and scanning lines 34. Each pixel electrode 36 is connected to an intersection between the associated signal line 32 and scanning line 34 via a thin-film transistor (hereinafter referred as TFT) 38 functioning as a switching element.

Each pixel electrode 36 has a substantially rectangular shape and constitutes one pixel. The size of one pixel is 80 μm×240 μm. The signal lines 32 are drawn out to one of the longer sides of the array substrate 20 and connected to the signal line drive circuit board 14 through the TCPs 18. The scanning lines 34 are drawn out to one of the shorter side of the array substrate 20 and connected to the scanning line drive circuit board 16 via the TCPs 18.

Each TFT 38, as shown in FIGS. 2 and 3, has a gate electrode 40 formed of a part of the scanning line 34. A gate insulating film 42 formed of a dielectric layer such as silicon oxide, silicon nitride, or the like is disposed on the gate electrode 40. A semiconductor film 43 formed of an a-Si (amorphous silicon) film is formed on the gate insulating film 42. On the semiconductor film 43 is disposed a silicon nitride film serving as a channel protection film 44 self-aligned with the scanning line 34.

The semiconductor film 43 is electrically connected to the pixel electrode 36 via an n+type a-Si film disposed as a low-resistance semiconductor film 46 and a source electrode 48. In addition, the semiconductor film 43 is electrically connected to the signal line 32 via the n+type a-Si film disposed as low-resistance semiconductor film 46 and a drain electrode 50 extending from the signal line 32.

On the other hand, the opposite substrate 22 has a transparent glass substrate 60. A first light-shield layer 62 formed of an oxide film of chromium (Cr) is provided on the glass substrate, and a second light-shield layer 63 of chromium (Cr) is laminated on the first light-shield layer. The first and second light-shield layers 62 and 63 are formed in a matrix so as to light-shield the TFTs 38, the gaps between the signal lines 32 and pixel electrodes 36 and the gaps between the scanning lines 34 and pixel electrodes 36 on the array substrate 20. Red (R), green (G) and blue (B) color filters 64 are formed at those positions on the glass substrate 60 which are opposed to the pixel electrodes 36 on the array substrate 20.

As regards the liquid crystal display panel 12 with the above structure, when the array substrate 20 is to be manufactured, a plurality of conductor layers and dielectric layers are formed on the glass substrate 31 and each layer is photo-etched into a predetermined pattern through a resist layer which is dividedly exposed. Thus, the above-described signal lines, scanning lines, pixel electrodes, gate insulating films, TFTs, etc. having predetermined shapes are formed.

For example, when the pixel electrodes are to be formed, an ITO layer is formed over the entire surface of the glass substrate 31 and a resist layer is formed on the ITO layer. The resist layer is exposed in a predetermined pattern, and the ITO layer is etched via the resist layer.

Figure 4:
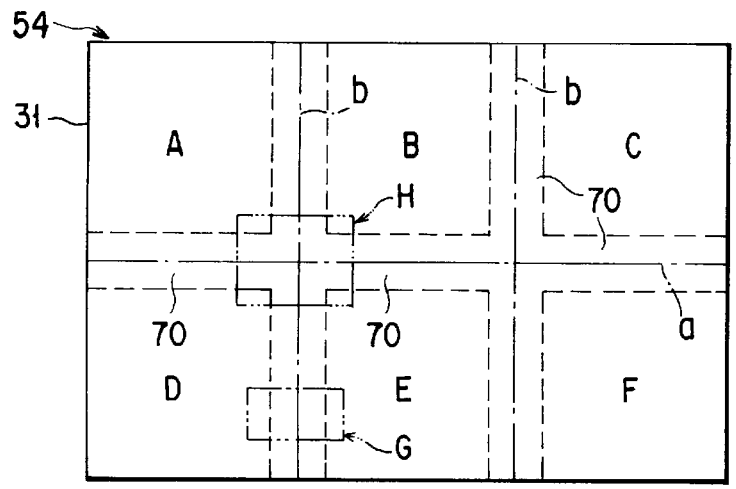
FIG. 4 is a plan view showing divided regions at the time of performing divisional exposure for the array substrate according to a manufacturing method of an embodiment of the invention.

According to the present embodiment, a resist layer 54 formed on the glass substrate is dividedly exposed into a plurality of divided regions, for example, into six divided regions A to F, as shown in FIG. 4. Each divided region has a substantially rectangular shape. Boundary regions 70 between adjacent divided regions A to F comprise a horizontal center line a and two vertical center lines b perpendicular to the horizontal center line a.

Figure 5:
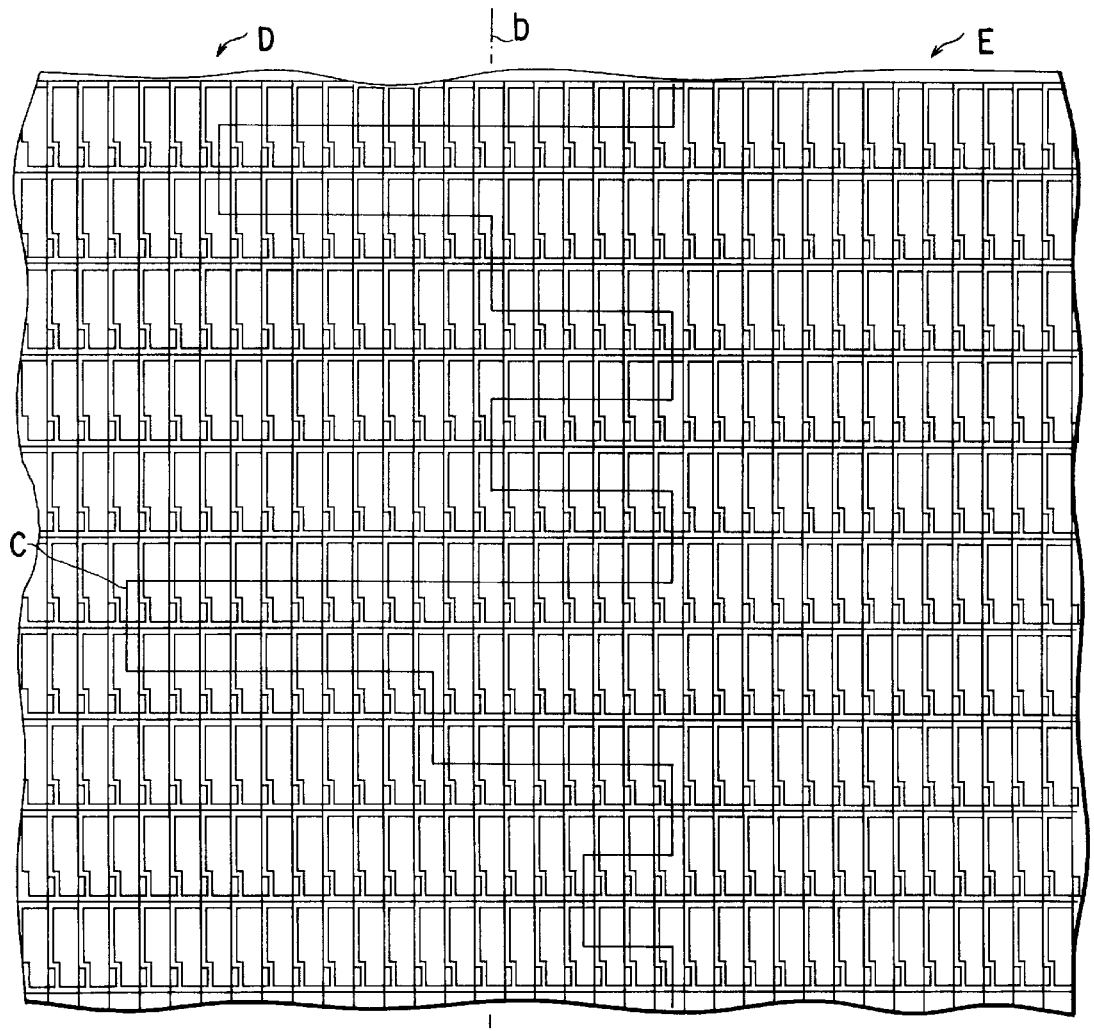
FIG. 5 is an enlarged plan view of a portion G of a vertical boundary region in FIG. 4.

As is shown in FIG. 5, the boundary line c, or seam of each divided regions has a pulse-wave like zigzag shape. The boundary line c of one divided region engages the boundary line c of the adjacent divided region, thereby constituting the boundary region 70 with a predetermined width. Since the boundary lines c of the respective divided regions A to F are formed in a zigzag manner and have a gradient in the boundary region 70, a gradient in variation of optical characteristics of the boundary region 70 can be decreased to such a degree that the boundary lines or seams between the divided regions A to F may not visually recognized.

Figure 6:
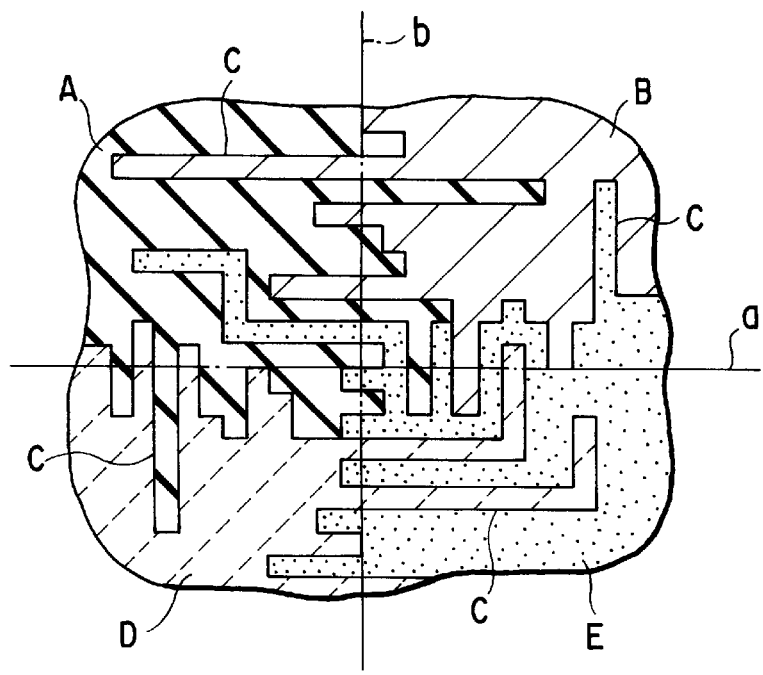
FIG. 6 is an enlarged plan view schematically showing a cross-shaped intersection H in FIG. 4.

In addition, as shown in FIG. 6, in a cross (+) shaped portion where the horizontal center line a and vertical center line b intersect at right angles, the boundary line c of at least one of the adjacent divided regions A, B, C and D (or B, C, E and F) has such a pattern as to extend into another diagonally adjacent divided region with respect to the intersection.

According to the embodiment shown in FIG. 6, the boundary line c of the divided region A has such a pattern as to extend into each of the horizontally adjacent divided region B, vertically adjacent divided region D and diagonally adjacent divided region E. The boundary line c of the divided region D has such a pattern as to extend into each of the horizontally adjacent divided region E, vertically adjacent divided region A and diagonally adjacent divided region B. Furthermore, the boundary line c of the divided region E has such a pattern as to extend into each of the horizontally adjacent divided region D, vertically adjacent divided region B and diagonally adjacent divided region A.

With the above formation of the boundary lines c of the divided regions A to F, the boundary lines or seams between the divided regions can be made less visible even at each of the cross-shaped portions where the horizontal center line a and vertical center lines b.

Experimental results show that, in the prior art, if the difference in transmissivity between the divided regions was 0.5% or more, the seam was recognized.

However, according to the liquid crystal display panel 12 of this embodiment, even if there was a difference in transmissivity of about 1.0% between the adjacent divided regions, the seam was not recognized at all.

According to the above-mentioned method of manufacturing a liquid crystal display device, the conductor layers and dielectric layers on the array substrate 20 are patterned by using resist layers each of which is dividedly exposed into a plurality of divided regions. In addition, the boundary lines c of each divided region is formed in a zigzag shape, and in the cross-shaped portion where the horizontal and vertical boundary lines of the boundary region intersect at right angles, the boundary line of at least one of the divided regions is so patterned as to extend into the diagonally adjacent divided region. Thus, the seam between the divided regions can be made less visible, and the liquid crystal display device with high display quality can be manufactured.

The present invention is not limited to the above embodiment, and various modifications may be made without departing from the scope of the invention. For example, in the above embodiment, the resist layer is dividedly exposed into six divided regions. The number of divisions, however, may be increased or decreased on an as-needed basis.

Figure 7A:
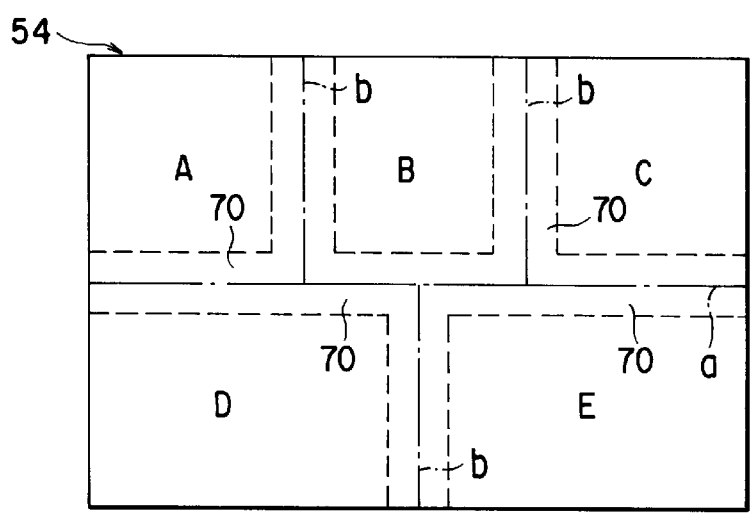
FIGS. 7A and 7B are plan views showing divided regions respectively at the time of performing divisional exposure according to a manufacturing method of modifications of the present invention.

The divided regions may or may not have the same shape and size. For example, as shown in FIG. 7A, a resist layer 54 formed on the glass substrate may be dividedly exposed into five regions A to E such that a horizontal center line a and each vertical center line b of the boundary region 70 form a T-shape. Alternatively, as shown in FIG. 7B, a resist layer 54 on the glass substrate may be dividedly exposed into two regions such that the horizontal center line a and the vertical division line b of the boundary region 70 form an L-shape.

Figure 8A:
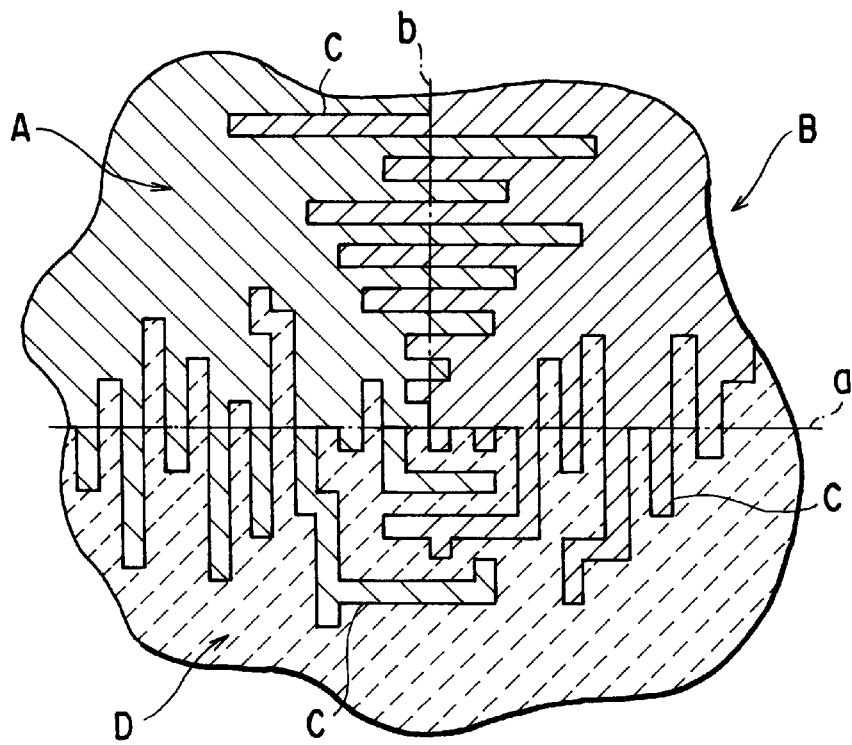
FIGS. 8A and 8B are enlarged plan views schematically showing a T-shaped intersection and an L-shaped joint portion, respectively.

In the case of the divisional exposure as shown in FIG. 7A, the boundary line of each divided region is formed in zigzag shapes and is engaged with the boundary line of the adjacent divided region within the boundary region 70. At each of the T-shaped intersections, as shown in FIG. 8A, the boundary line c of at least one of the horizontally adjacent two divided regions has a pattern which extends into a region opposing in a diagonal direction with respect to the intersection.

Figure 7B:
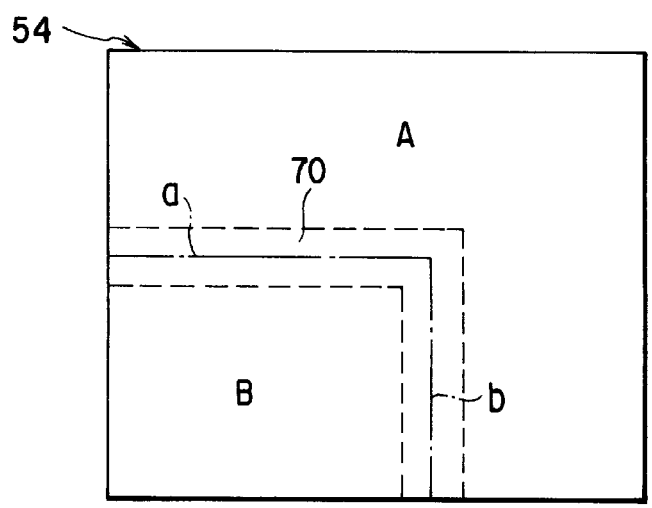
Figure 8B:
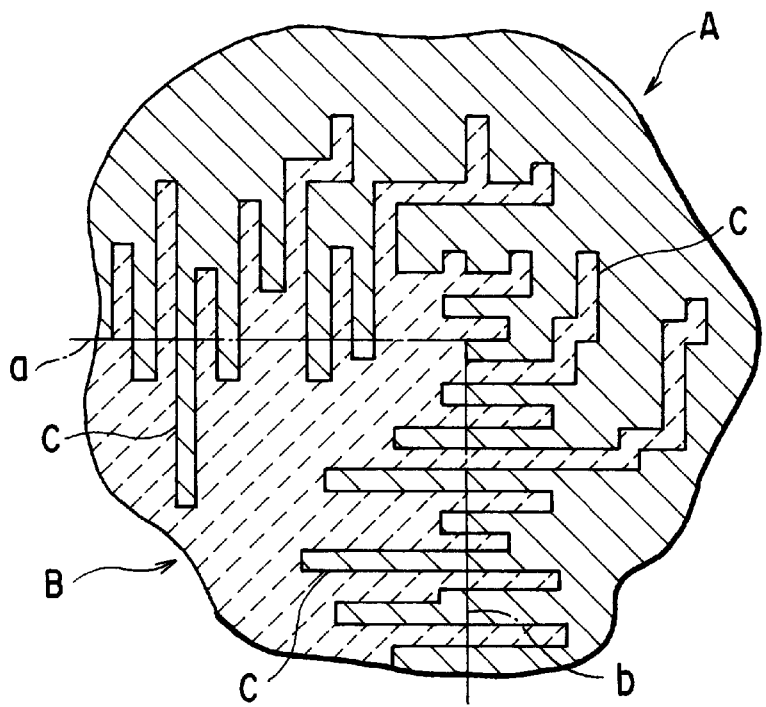

In the case of the divisional exposure as shown in FIG. 7B, the boundary lines of the divided region A and B are formed in zigzag shapes and are engaged each other within the boundary region 70. At the L-shaped joint portion, as shown in FIG. 8B, the boundary line c of at least one of the two divided regions A and B is formed to have a pattern extending in a diagonal direction with respect to the intersection.

In the cases as shown in FIGS. 7A, 7B, 8A and 8B, as in the preceding embodiment, a liquid-crystal display device with high display quality, wherein the seams between the divided regions are less visible, can be manufactured.

As has been described above in detail, the present invention provides a method of manufacturing a large-area liquid-crystal display device with high display quality, wherein the seams among the divided regions can be made less visible at the cross-shaped portion, T-shaped portion and L-shaped portion where boundary center lines intersect or are joined with each other at the time of performing divisional exposure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a liquid-crystal display device, the method comprising:

forming at least one layer of a conductor layer and a dielectric layer on an insulating substrate;

forming a resist layer on said one layer;

dividedly exposing the resist layer into a plurality of divided regions; and patterning said one layer into a predetermined shape by etching said one layer through the exposed resist layer, wherein at the time of the exposure, a boundary line of each of the respective divided regions is formed in a zigzag shape and engaged with a boundary line of another adjacent one of the divided regions, and the zigzag-shaped boundary line of each of the divided regions has such a pattern as to extend into another diagonally opposed one of the divided regions at a region where a horizontal boundary line horizontally dividing the divided regions and a vertical boundary line vertically dividing the divided regions intersect or are joined with each other.

2. A method according to claim 1, wherein the resist layer is dividedly exposed such that the horizontal boundary line and the vertical boundary line intersect at right angles, and at a cross-shaped intersection portion where the horizontal and vertical boundary lines intersect at right angles, a boundary line of at least one of the four adjacent divided regions has such a pattern as to extend into another of the divided regions which is diagonally adjacent with the intersection portion interposed.

3. A method according to claim 1, wherein the resist layer is dividedly exposed such that the horizontal boundary line and the vertical boundary line form a T-shaped intersection, and at a T-shaped intersection portion of the horizontal and vertical boundary lines, a boundary line of at least one of the three adjacent divided regions has such a pattern as to extend into another of the divided regions which is diagonally adjacent with the intersection portion interposed.

4. A method according to claim 1, wherein the resist layer is dividedly exposed such that the horizontal boundary line and the vertical boundary line form an L-shape joint portion, and at a L-shaped joint portion of the horizontal and vertical boundary lines, a boundary line of at least one of the two adjacent divided regions has such a pattern as to extend into the other of the divided regions which is diagonally adjacent with the T-shaped joint portion interposed.

\* \* \* \* \*